United States Patent
Wagner

(10) Patent No.: US 9,312,898 B2
(45) Date of Patent: Apr. 12, 2016

(54) APPARATUS AND A METHOD FOR HANDLING A RECEIVED SIGNAL, AND A MIXER UNIT

(71) Applicant: Infineon Technologies AG, Neubiberg (DE)

(72) Inventor: Christoph Wagner, Enns (AT)

(73) Assignee: Infineon Technologies AG, Neubiberg (DE)

( * ) Notice: Subject to any disclaimer, the term of this patent is extended or adjusted under 35 U.S.C. 154(b) by 22 days.

(21) Appl. No.: 14/261,960

(22) Filed: Apr. 25, 2014

(65) Prior Publication Data

US 2014/0329482 A1  Nov. 6, 2014

(30) Foreign Application Priority Data

May 2, 2013 (DE) .......................... 10 2013 104 485

(51) Int. Cl.
| | |
|---|---|
| H04B 1/00 | (2006.01) |
| H04B 1/12 | (2006.01) |
| G01S 7/02 | (2006.01) |
| G01S 7/03 | (2006.01) |
| H04B 15/04 | (2006.01) |
| H04B 15/00 | (2006.01) |

(52) U.S. Cl.
CPC . *H04B 1/12* (2013.01); *G01S 7/023* (2013.01); *G01S 7/03* (2013.01); *H04B 15/04* (2013.01)

(58) Field of Classification Search
CPC ..... H04L 25/06; H04L 25/061; H04L 25/063; H04B 1/123
USPC ................... 455/296, 302; 375/319
See application file for complete search history.

(56) References Cited

U.S. PATENT DOCUMENTS

| | | | |
|---|---|---|---|
| 4,970,519 A | 11/1990 | Minnis | |
| 5,861,837 A | 1/1999 | Richardson | |
| 6,404,378 B1 | 6/2002 | Solbach | |
| 6,711,396 B1 | 3/2004 | Bergsma | |
| 6,970,689 B2 | 11/2005 | Khorram | |
| 7,603,096 B2 | 10/2009 | Chung | |
| 2005/0195024 A1* | 9/2005 | Cheng | ............................. 330/9 |
| 2009/0154595 A1 | 6/2009 | Choksi | |
| 2009/0323864 A1* | 12/2009 | Tired | ............................ 375/319 |
| 2011/0188555 A1 | 8/2011 | Han | |

FOREIGN PATENT DOCUMENTS

| | | |
|---|---|---|
| DE | 10 2012 106 101 A | 3/2013 |
| DE | 10 2012 106 101 A1 | 3/2013 |
| EP | 1 681 578 A1 | 7/2006 |

* cited by examiner

*Primary Examiner* — Lee Nguyen
(74) *Attorney, Agent, or Firm* — Eschweiler & Associates, LLC

(57) ABSTRACT

An apparatus for handling a received signal comprises a reception device, a mixer unit and a compensating unit. The reception unit can receive a received signal. The received signal has at least one signal component at a first frequency. Furthermore, the mixer unit can combine the received signal and a compensating signal using at least one active element in order to obtain a compensated received signal. In addition, the mixer unit can produce a mixer output signal on the basis of the compensated received signal and a local oscillator signal. In this case, the mixer output signal has a signal component, corresponding to the at least one signal component of the received signal, at a second frequency. The first frequency is higher than the second frequency. Furthermore, the compensating unit can produce the compensating signal on the basis of an analysis of the mixer output signal, as a result of which it is possible for noise components that the mixer output signal contains to be reduced on the basis of the compensating signal.

17 Claims, 6 Drawing Sheets

APPARATUS AND A METHOD FOR HANDLING A RECEIVED SIGNAL, AND A MIXER UNIT

RELATED APPLICATION

This application claims the benefit of German Patent Application No. 102013104485.9, filed May 2, 2013, which is incorporated herein by reference in its entirety.

TECHNICAL FIELD

Exemplary embodiments relate to concepts for the frequency conversion of electrical signals and particularly to an apparatus and a method for handling a received signal and to a mixer unit.

BACKGROUND

The frequency conversion of electrical signals is performed in communications engineering by mixers, for example. In the case of down-conversion on receivers, for example, a radio frequency useful signal is mixed to a low-frequency intermediate frequency or base frequency using an oscillator signal. The mixing often results in undesirable frequency components being produced by noise signals that the received signal already contains or noise components that are produced by the mixing itself.

By way of example, a problem with homodyne receivers is that a noise signal is applied to the antenna input or RF (radio frequency) input at (approximately) the same frequency as the local oscillator signal (LO), which can result in undesirable DC voltage output signals (DC). This can decrease the efficiency of the receiver as a result of the imbalance in the circuitry that arises in the process. Furthermore, further processing of the signal that is subject to DC voltage interference can often be difficult.

In most radar systems, sending and receiving take place at the same time and at the same frequency, for example. As a result, self-interference in the sensor is a large problem. The circuit block affected most is usually the reception mixer, since this is often the most sensitive component in the signal path. It is often necessary to handle very small useful signals together with strong sources of interference, which are caused primarily by self-interference. By way of example, it is possible to use very highly linear mixers in order to prevent degradation of performance in the presence of self-interference. This typically results in high power consumption and noise.

There is therefore the need to provide a concept for the frequency conversion of received signals that allows noise signal components and/or the power consumption to be reduced.

SUMMARY

This need is taken into account by embodiments of an apparatus for handling a received signal, a mixer unit and a method for handling a received signal.

Some exemplary embodiments relate to an apparatus for handling a received signal that has a reception device, a mixer unit and a compensating unit. The reception device is designed to receive a received signal. The received signal has at least one signal component at a first frequency. Furthermore, the mixer unit is designed to combine the received signal and a compensating signal using at least one active element in order to obtain a compensated received signal. In addition, the mixer unit is designed to produce a mixer output signal on the basis of the compensated received signal and a local oscillator signal. In this case, the mixer output signal has a signal component, corresponding to the at least one signal component of the received signal, at a second frequency. The first frequency is higher than the second frequency. Furthermore, the compensating unit is designed to produce the compensating signal on the basis of an analysis of the mixer output signal, as a result of which it is possible for noise components that the mixer output signal contains to be reduced on the basis of the compensating signal.

The implementation of an additional input on the mixer unit for a compensating signal and of the coupling of the received signal to the compensating signal by means of at least one active element directly in the mixer unit makes it a simple matter, on the basis of an analysis of the mixer output signal, to reduce the noise component in the output signal from the mixer unit. Furthermore, the power consumption can be kept down.

In some exemplary embodiments, the compensating unit is designed to provide the compensating signal iteratively on the basis of repeated analysis of the mixer output signal. This may allow the noise signal component to be significantly reduced over a plurality of iterations.

Some exemplary embodiments relate to a mixer unit having an input stage and a mixer stage. The input stage has a first transconductance stage and a second transconductance stage. The first transconductance stage is designed to convert a received voltage signal into a first current signal, and the second transconductance stage is designed to convert a compensating voltage signal into a second current signal. Furthermore, the input stage is designed to sum the first current signal and the second current signal in order to obtain a summed current signal. The mixer stage is designed to mix the summed current signal with a local oscillator signal in order to obtain a mixer output signal.

BRIEF DESCRIPTION OF THE DRAWINGS

Exemplary embodiments are explained in more detail below with reference to the appended figures, in which.

DETAILED DESCRIPTION

In the description that follows for the appended figures, which show exemplary embodiments, the same reference symbols denote components that are the same or comparable. Furthermore, joint reference symbols are used for components and objects that occur repeatedly in an exemplary embodiment or in a drawing but are described for one or more features collectively. Components or objects that are described using the same or joint reference symbols may be embodied in the same way, but may also be embodied differently, in respect of single, multiple or all features, for example the dimensions thereof, unless the description explicitly or implicitly reveals otherwise.

Figure 1:
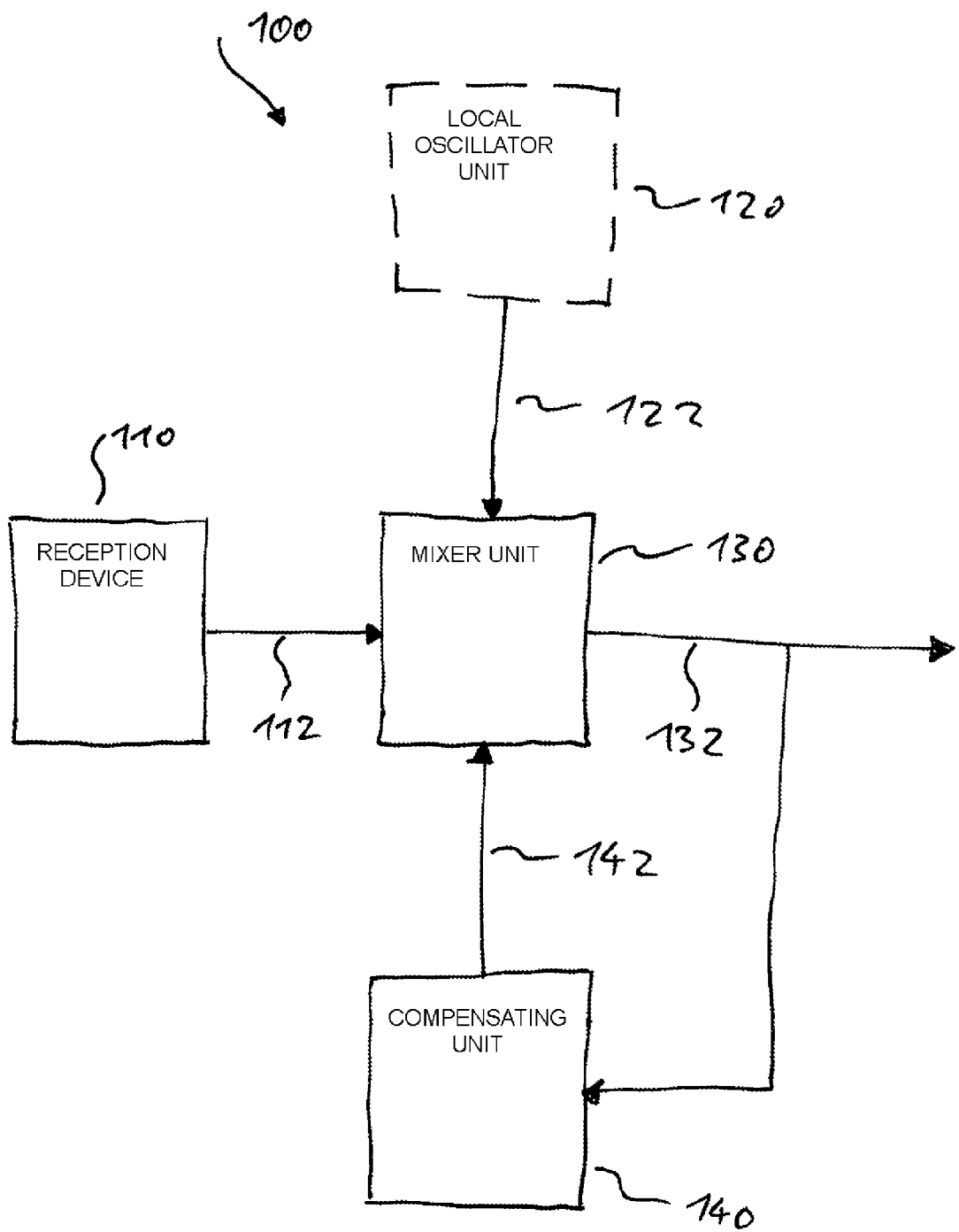
FIG. 1 shows a block diagram of an apparatus for handling a received signal.

FIG. 1 shows a block diagram of an apparatus 100 for handling a received signal 112 according to an exemplary embodiment. The apparatus 100 comprises a reception device 110, an optional local oscillator unit 120, a mixer unit 130 and a compensating unit 140. The reception device 110 has an output connected to an input of the mixer unit 130, the local oscillator unit 120 has an output connected to an input of the mixer unit 130, the compensating unit 140 has an output connected to an input of the mixer unit 130 and the mixer unit 130 has an output connected to an input of the compensating unit 140. The reception device 110 can receive a received signal 112. This received signal has at least one signal component at a first frequency. The local oscillator unit 120 can provide a local oscillator signal 122 at a local oscillator frequency. Furthermore, the mixer unit 130 can combine the received signal 112 and a compensating signal 142 using (or on the basis of) at least one active element in order to obtain a compensated received signal. In addition, the mixer unit 130 can produce a mixer output signal 132 on the basis of the compensated received signal and the local oscillator signal 122. In this case, the mixer output signal has a signal component, corresponding to the at least one signal component of the received signal, at a second frequency. In this case, the first frequency is higher than the second frequency. Furthermore, the compensating unit 140 can produce the compensating signal 142 on the basis of an analysis of the mixer output signal 132, as a result of which it is possible for noise components that the mixer output signal 132 contains to be reduced on the basis of the compensating signal 142.

The active element allows the received signal 112 to be combined with the compensating signal 142 with low or negligible losses directly in the mixer unit. As a result, it is possible for components of noise signals in the mixer output signal 142 to be reduced with little involvement and/or low power consumption.

The reception device 110 may be an input interface of the apparatus 100 or of the mixer unit 130, for example in order to receive a received signal 112 from a transmitter via a wired connection. Alternatively, the reception device 110 may also be designed to receive a received signal from a transmitter wirelessly. To this end, the reception device 110 may have an antenna, one or more filters and/or one or more amplifiers, for example, in order to receive and optionally preprocess the received signal. Optionally or in addition, the reception device 110 may also be in the form of a transmission and reception device in order both to be able to send signals and to be able to receive the received signal 112.

The received signal 112 may be an arbitrary signal that has signal components that are intended to have their frequency converted to a lower frequency. To this end, the received signal 112 may have useful signal components in one or more frequency bands or at one or more frequencies. At least one of these signal components has a frequency that, following processing by the mixer unit 130, ends up at the second frequency in the mixer output signal 132. By way of example, the received signal 112 may have a maximal or predefined signal amplitude or a maximal or predefined signal power at the first frequency, or the first frequency may correspond to a predefined frequency that is intended to be converted to the second frequency (e.g. predefined intermediate frequency or baseband frequency) for the further processing of the received signal.

The optional local oscillator unit 120 may be an external unit or may be part of the apparatus 100 and can be implemented in different ways. By way of example, the local oscillator unit 120 may have a crystal oscillator, a voltage-controlled oscillator or another source that provides a mixing signal for the mixing unit in order to produce the local oscillator signal 122.

The local oscillator signal 120 may essentially be a signal at the local oscillator frequency or may have frequency components in different frequency bands or at one or more different frequencies. Often, the local oscillator signal 122 is provided at precisely one frequency with very low tolerance (e.g. <1%, <0.1% or <0.01% of the local oscillator frequency). Optionally, the local oscillator signal 120 can also be frequency-modulated or the local oscillator frequency can be altered in accordance with a predefined frequency ramp (e.g. in the case of radar applications). It is thus possible for the local oscillator signal 120 also to be provided at a signal frequency that can be altered in a controlled manner.

The mixer unit 130 combines (e.g. adding, summing or subtracting) the received signal 112 and the compensating signal 142 using (or with the aid of) at least one active element. In contrast to passive elements, an active element is an electrical assembly, for example, that is capable of amplifying a voltage, a current or a power for a signal. By way of example, the active element may be a transistor (e.g. bipolar transistor, field-effect transistor, metal oxide semiconductor transistor) or another electrical element with corresponding functionality. By contrast, passive elements (e.g. directional couplers) cannot enable such amplification of their own accord. By way of example, the apparatus 100 thus uses a directional coupler for combining the received signal 112 and the compensating signal 142. For combining the two signals, (precisely) one active element may be sufficient (e.g. a transistor). Alternatively, it is possible to use more than one active element for combining the two signals (e.g. at least two transistors in the case of a differential design).

Furthermore, the mixer unit 130 produces a mixer output signal 132 on the basis of the compensated received signal and the local oscillator signal 122, as a result of which the mixer output signal 132 has signal components corresponding to the received signal 112 at a lower frequency than in the received signal 112. In other words, the mixer unit 130 can mix the compensated received signal with the local oscillator signal 122, as a result of which, inter alia, signal components are produced that correspond to signal components of the received signal 112 and in so doing have a lower frequency. By way of example, it is thus possible for useful signal components of the compensated received signal to be converted from a radio frequency range to an intermediate frequency range, baseband frequency range or low-frequency range. By way of example, the mixer unit 130 may have a mixer in order to mix the compensated received signal with the local oscillator signal 122 in order to produce the mixer output signal 132.

The compensating unit 140 can produce the compensating signal 142 on the basis of an analysis of the mixer output signal 132. Analysis of the mixer output signal 132 can be performed in different ways. By way of example, temporal and/or frequency-selective analysis of signal portions can be effected in order to determine the nature and scope of noise signal components. Alternatively, a parameter can be ascertained that indicates a piece of information about an absolute or relative magnitude of the noise signal components in a predetermined frequency range and/or a predetermined period of time.

On the basis of this analysis, the compensating unit 140 can produce the compensating signal 142 such that the mixer output signal 132 contains, as a further consequence, fewer noise components or components of noise signals (e.g. noise or nonlinear signal components). By way of example, the compensating unit 140 can repeatedly perform an analysis of the mixer output signal 132 (e.g. determination of a parameter or temporal and/or frequency-selective analysis of the mixer output signal) and can repeatedly alter the compensating signal 142, as a result of which noise signals or noise signal components can be reduced or are reduced at least in one frequency range (e.g. DC component or low-frequency range). In other words, the compensating unit 140 can provide the compensating signal 142 iteratively on the basis of repeated analysis of the mixer output signal 132. This allows the noise signal component in the mixer output signal 132 to be reduced over a plurality of iterations.

Alternatively, the compensating unit 140 can also produce an optimum or very good compensating signal 142 directly from the analysis of the mixer output signal 132 without having to perform a plurality of iterations. This allows a noise signal component in the mixer output signal 132 to be reduced significantly more quickly, but this may require a relatively high level of calculation involvement or hardware involvement for the compensating unit 140.

By way of example, the compensating unit 140 can produce the compensating signal 142 such that the compensating signal 142, when combined with the received signal 112, cancels at least one portion of the noise signals from the received signal 112 (e.g. by destructive interference) at least in one frequency range.

Figure 2:
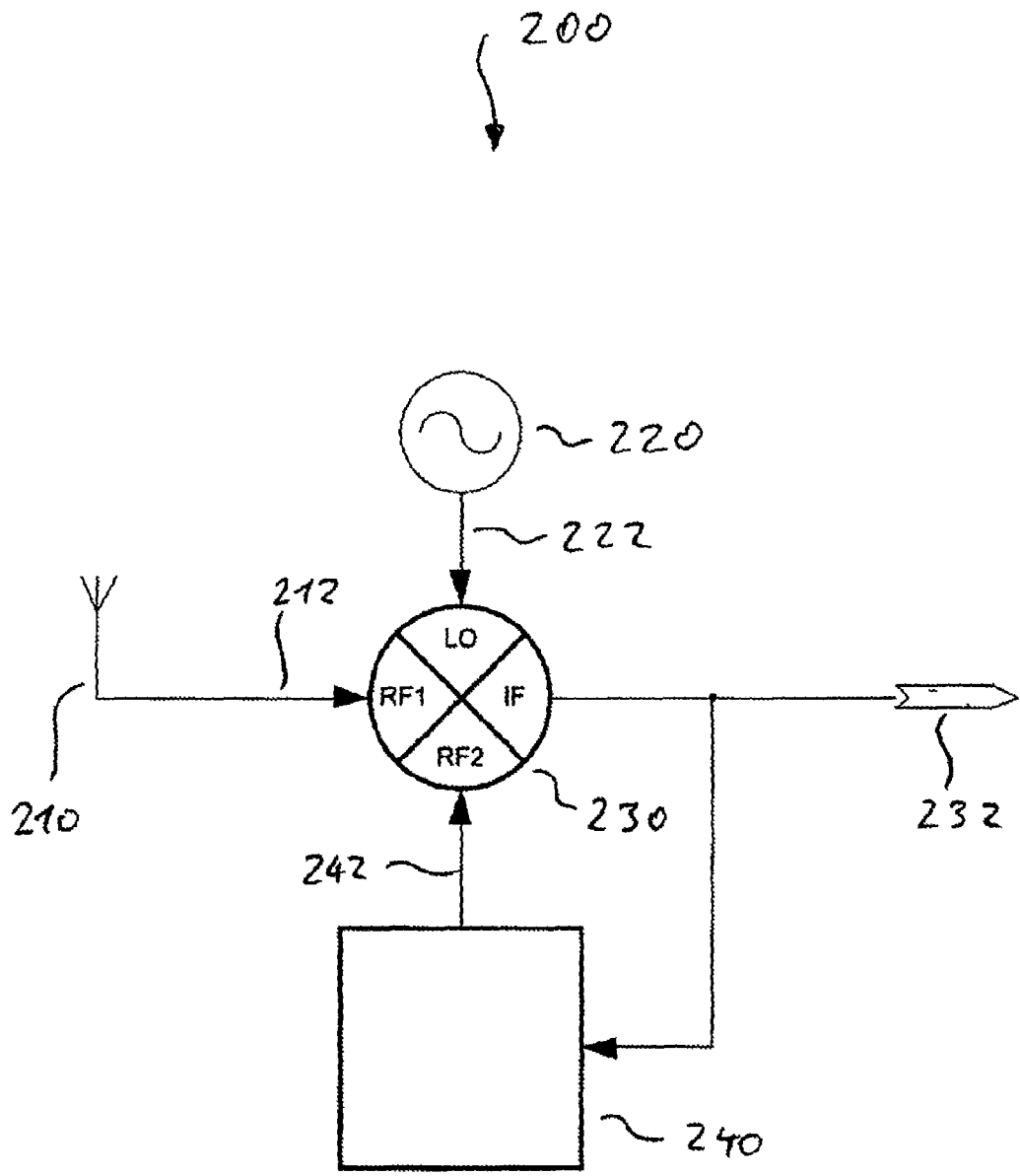
FIG. 2 shows a block diagram of a further apparatus for handling a received signal.

FIG. 2 shows a further apparatus 200 for handling a received signal 212 according to an exemplary embodiment. The design of the apparatus 200 essentially corresponds to the design shown in FIG. 1, which means that the comments made above likewise apply accordingly to the apparatus 200. In this example, the reception device 210 has an antenna in order to be able to wirelessly receive a received signal 212 (e.g. a strong signal (interference) at the local oscillator frequency). Furthermore, the local oscillator 220 provides a local oscillator signal LO 222 for down-conversion of the received signal RF1 221. The compensating unit 240 is designed to find a compensating signal RF2 222 that minimizes or reduces the DC output signal at the output of the mixer unit 230. The mixer unit 230 can then provide a mixer output signal IF 232 having a minimized or reduced DC output signal.

In accordance with the example shown in FIG. 2, it is possible to implement a homodyne receiver with blocker rejection (noise signal rejection), for example.

The mixer unit 130 can produce the mixer output signal 132 continuously for the same phase angle of the local oscillator signal 112. Often, however, a minimum DC voltage signal is applied to the mixer output even when noise signals and the local oscillator signal 122 have a phase angle of 90° relative to one another. This may be undesirable, however, since in that case, despite an (approximately) nulled output signal, there may be a high output signal at the mixer input (received signal) that the control system cannot eliminate or reduce, or can eliminate or reduce only with difficulty. Therefore, in many applications or apparatuses, the phase angle of the local oscillator signal 122 can be chosen in switchable fashion so as to be able to choose between 0° and 90° local oscillator phase, for example. The control system can reduce or minimize the sum of the squares of the two resultant DC voltage signals for 0° phase angle and 90° phase angle of the local oscillator signal 122, for example.

Figure 3:
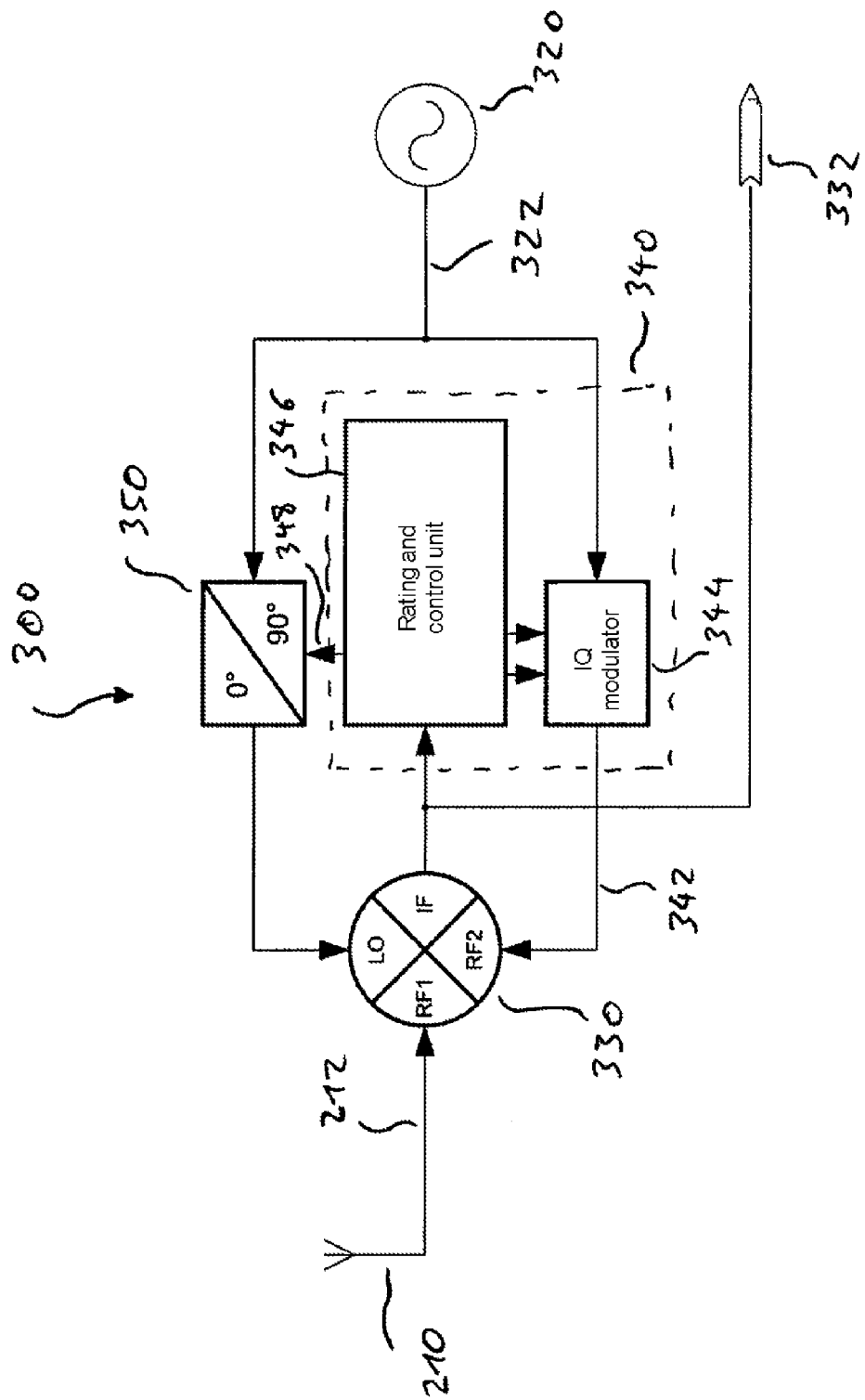
FIG. 3 shows a block diagram of a further apparatus for handling a received signal.

In other words, the apparatus 100, 200 may optionally, alternatively, or in addition to one or more of the aforementioned aspects, have a phase shifter 350, as shown as an exemplary embodiment for the apparatus 300 in FIG. 3. The phase shifter 350 is arranged between the local oscillator unit 320 and the mixer unit 330 and can provide the local oscillator signal 322 in temporally successive periods for the mixer unit 330 with different phase shifts, as a result of which the mixer output signal 332 has temporally successive components with different phase shifts. The compensating unit 340 can then produce the compensating signal 342 on the basis of at least two portions of the mixer output signal 332 with different phase shifts for the local oscillator signal 322.

The temporal control of the phase shift for the local oscillator signal 322 via the phase shifter 350 can be effected by an external control unit, by a control unit of the local oscillator 320 or by a control unit of the compensating unit 340 (as shown in the example of FIG. 3) repeatedly at equal intervals of time, random intervals of time or at predetermined intervals of time. In other words, the compensating unit 340 can produce a control signal 348 for the phase shifter 350, for example, as a result of which a chronology for different phase shifts can be controlled via the control signal 348. This additionally makes it possible to ensure that the compensating unit 340 knows when portions of the mixer output signal 332 are present, and with what phase shift, for the analysis of the mixer output signal 332.

The respective phase shift between two temporally successive periods may have arbitrary values. By way of example, the phase shift may alternately always be +90° and −90° (e.g. alternately a 0° phase angle and a 90° phase angle). Alternatively, it is also always possible for the phase to be advanced through +90° (or −90°), for example. The periods of time in which the mixer output signal 332 is produced with a particular phase angle for the local oscillator signal 322 before the phase of the local oscillator signal 322 is shifted again may be of arbitrary length. By way of example, the frequency at which the phase shift is performed is significantly lower than the frequency of the local oscillator signal 322. By way of example, the phase shift can be effected at a frequency that is lower than $1/1000$ (or lower than $1/5000$, lower than $1/10000$, lower than $1/50000$ or lower than $1/100000$) of the local oscillator frequency. By way of example, in radar applications it is possible to use a local oscillator signal at a frequency between 50 GHz and 100 GHz (e.g. 77 GHz) and the phase shift can be effected at a frequency between 100 Hz and 1 MHz (or between 1 kHz and 10 kHz). Expressed conversely, the local oscillator signal 322 is applied without a phase shift, for example, for a period of time from 1 μs to 10 ms (or from 100 μs to 1 ms).

As an alternative to a phase shifter 350, the mixer unit 330 may have a second mixer, for example, that can produce a second mixer output signal on the basis of the received signal 212, a phase-shifted local oscillator signal and the compensating signal 342. In this case, the second mixer output signal likewise has a signal component, corresponding to the at least one signal component of the received signal 212, at the second frequency. The compensating unit 340 can then produce the compensating signal 342 on the basis of the first and second mixer output signals, as has been described for the example in FIG. 3. The second mixer can likewise combine the received signal 212 with the compensating signal 342 by first of all using at least one active element and can produce the second mixer output signal on the basis of the compensated received signal and the local oscillator signal 322, for example. Alternatively, the second mixer can use the compensated received signal, which the first mixer also uses to produce the first mixer output signal.

The implementation of a second mixer allows the analysis of the mixer output signal to be effected more quickly, since the two phase-shifted output signals are present simultaneously, but this can also increase the hardware involvement.

As already mentioned, the mixer output signal can be analyzed in a wide variety of ways. By way of example, the compensating unit 340 can, during the analysis of the mixer output signal 332 (or of the two mixer output signals from the two mixers), calculate an absolute value for a complex number that has a real portion, calculated on the basis of a portion of the mixer output signal 322 (or one of the two mixer output signals) that is based on a first phase shift for the local oscillator signal, and an imaginary portion, calculated on the basis of a portion of the mixer output signal 332 (or the other of the two mixer output signals) that is based on a second phase shift of the local oscillator signal 322.

Furthermore, the compensating unit 340 can calculate an absolute value for the complex number (and optionally also a phase for the complex number). The compensating unit 340 can then produce the compensating signal 342 such that the absolute value of the complex number can be reduced, for example.

In other words, the residual noise component (in the mixer output signal) can be rated via the mixer output signal IF output of the mixer (or of the mixer unit) in combination with a local oscillator signal 322 that can have the phase switched, for example. The rating and control unit (e.g. part of the compensating unit) in FIG. 3 can produce two phase conditions at 0° and 90° relative phase of the local oscillator signal 322 in a manner staggered over time and can produce the mixer output signal IF 332 as a compiled complex signal:

$$V_{IF,complex} = V_{IF,LOPhase0°} + jV_{IF,LOPhase90°}$$

By way of example, it is thus possible to present a complex mixing process using the time-division multiplexing method. It is therefore possible to determine the absolute value and/or phase of the remaining noise signal component, this being able to be used for determining the compensating signal 342.

In this case, by way of example, $V_{IF,LOPhase0°}$ is a DC voltage offset at 0°, $V_{IF,LOPhase90°}$ is a DC voltage offset at a 90° phase angle and $V_{IF,complex}$ is a complex number. This complex number can calculate absolute value and/or phase. The compensating signal 342 can be produced such that the absolute value is minimized or reduced.

In other words, the real portion of the complex number may correspond to a DC voltage component of the mixer output signal 332 for the first phase shift of the local oscillator signal 322 or may be based on such a DC voltage component, and the imaginary portion may correspond to a DC voltage component of the mixer output signal 332 for the second phase shift of the local oscillator signal 322 or may be based on such a DC voltage component. In this case, the first or the second phase shift may also be 0°, so long as the first and second phase shifts are different.

This compensating signal 342 can be supplied to the second RF input RF2 (input for the compensating signal) of the mixer (or of the mixer unit) and can be added to the first RF input RF1 (received signal) at that point upstream of the mixing process. If the absolute value of the compensating signal 342 at RF2 is chosen to be (essentially) the same as that of the noise signal at the RF1 input, and the phase is inverted, that is to say that 180° is set relative to the noise signal, then a desired cancellation effect can be obtained.

The compensating signal 340 can be produced by the compensating unit 340 in different ways. By way of example, the mixer output signal 332 can be modified and can be fed back to the mixer unit 330 as a compensating signal 342.

Optionally, alternatively, or in addition to one of the aforementioned aspects, the compensating unit 340 can produce the compensating signal 342 on the basis of a local oscillator signal 342 (from the local oscillator unit) that is modified on the basis of the analysis of the mixer output signal 332. By way of example, the local oscillator signal 322 can have its absolute value and phase modified (e.g. by amplitude and/or phase modulation) such that the noise signal components in the mixer output signal 332 are reduced.

Such modification can be performed in different ways. By way of example, this can be accomplished using an in-phase/quadrature phase modulator 344, as shown in the example of FIG. 3. In other words, the compensating unit 340 may have an in-phase/quadrature phase modulator 340 that modifies the local oscillator signal 322 on the basis of the analysis of the mixer output signal 332 in order to obtain the compensating signal 342. In this way, it is a simple matter to obtain a compensating signal 342 that can reduce the noise components of the mixer output signal 332.

In other words, the actuating element used for the compensating signal 342 may (as shown in FIG. 3) be an IQ modulator, which can modify the absolute value and/or phase of a portion of the local oscillator signal 322 in accordance with the signals at its in-phase input I and quadrature phase input Q.

As already described, the compensating signal 342 can be produced iteratively. By way of example, in a first iteration, the in-phase and quadrature phase signals can be used to set the absolute value and phase of the local oscillator signal to 0, and, in a second iteration, the absolute value to 0.5 and the phase to 0 or vice versa, and the influence of the mixer output signal 332 can be taken as the basis for performing the further iterations.

By way of example, the analysis of the mixer output signal 332 and the provision of the control signal 348 for the phase shifter 350 and the in-phase and quadrature phase signals for the in-phase/quadrature phase modulator 344 can be performed and provided by a rating and control unit 346 of the compensating unit 340, as shown in the example of FIG. 3. The apparatus 300 can implement active noise signal rejection with a rating and control unit, for example.

In this case, despite the noise signal at the RF input, for example, it is possible to achieve a minimized or reduced noise signal for DC (DC voltage) at the LO frequency.

In addition, the comments already made above in relation to FIGS. 1 and 2 and also the exemplary embodiments thereof and the general concept apply to the apparatus 300. Accordingly, it is also possible to combine one or more aspects mentioned in conjunction with FIG. 3 with one of the preceding exemplary embodiments or the general concept.

The reception device, the local oscillator unit, the mixer unit, the compensating unit and/or the phase shifter may be standalone hardware units or part of a processor, microcontroller or digital signal processor and also part of a computer program or of a software product for execution of a processor, microcontroller or digital signal processor. The various units may be implemented independently of one another or at least to some extent collectively.

The mixer unit can be implemented in different ways. By way of example, an adder for combining the received signal and the compensating signal may be arranged upstream of a mixer. Alternatively, the combiner may be integrated in the mixer.

By way of example, the mixer unit may have a mixer or a mixer stage, a first transconductance stage and a second transconductance stage. The first transconductance stage can then convert the received signal, which is present as a voltage signal, into a first current signal, and the second transconductance stage can convert the compensating signal, which is likewise present as a voltage signal, into a second current signal. The mixer unit can then sum the first current signal and the second current signal in order to obtain a summed current signal. Furthermore, the mixer can mix the summed current signal with the local oscillator signal in order to obtain the mixer output signal.

In this case, by way of example, a voltage signal is a signal that is supplied by a voltage source and cannot readily be summed with another voltage signal, for example. By contrast, a current signal is, by way of example, a signal that is supplied by a current source and can easily be summed with another current signal, for example.

Optionally, each of the two transconductance stages in this case may have a current source that can be connected by means of a transistor as an active element for the purpose of producing the relevant current signal when the received signal or the compensating signal is applied to a control connection of the transistor.

Furthermore, the mixer unit may optionally have a differential design.

Figure 4:
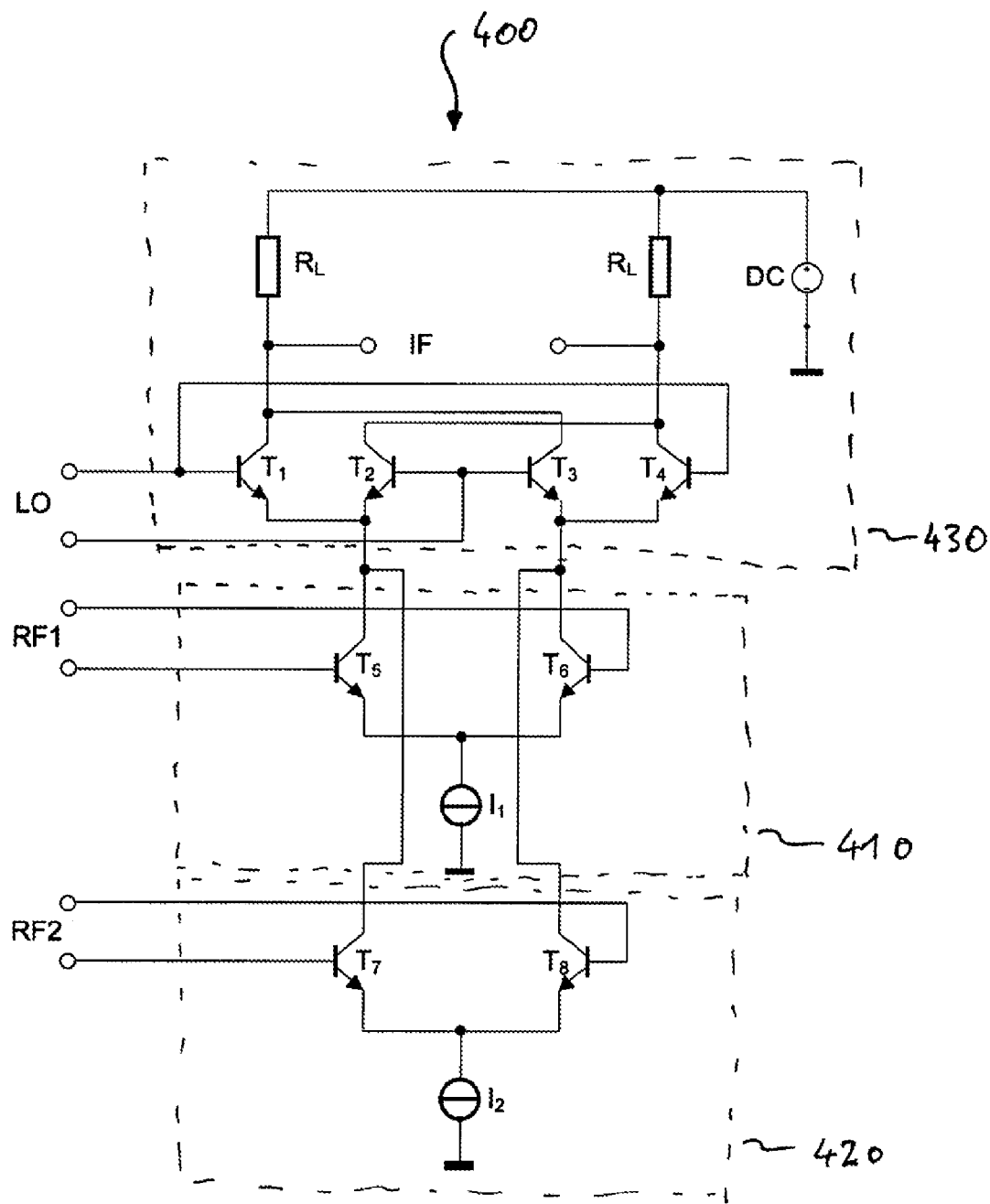
FIG. 4 shows a circuit diagram of a mixer unit.

An example of such a mixer unit 400 is shown in FIG. 4. The first transconductance stage 410 has a current source $I_1$, a first transistor $T_5$ and a second transistor $T_6$. The current source $I_1$ is connected to an emitter connection (source connection) of the first transistor $T_5$ and to an emitter connection of the second transistor $T_6$. Furthermore, the current source $I_1$ is connected to a reference potential (e.g. ground). The first transistor $T_5$ of the first transconductance stage 410 has its collector connection (sink connection) connected to a first input of the mixer or of the mixer stage 430, and the second transistor $T_6$ of the first transconductance stage 410 has its collector connection connected to a second input of the mixer stage 430. A first differential signal for the received signal RF1 is applied to the base connection (control electrode) of the first transistor $T_5$, and a second differential signal for the received signal is applied to the base connection of the second transistor $T_6$. The second transconductance stage 420 likewise has a current source $I_2$, a first transistor $T_7$ (active element) and a second transistor $T_8$ (active element). The current source $I_2$ again has an output connected to a reference potential (e.g. ground) and has a second output connected to the emitter connection of the first transistor $T_7$ and to the emitter connection of the second transistor $T_8$ of the second transconductance stage 420. The first transistor $T_7$ of the second transconductance stage 420 is connected to the first input of the mixer stage 430, and the collector connection of the second transistor $T_8$ of the second transconductance stage 420 is connected to the second input of the mixer stage 430. A first differential signal for the compensating signal RF2 is applied to a base connection of the first transistor $T_7$ of the second transconductance stage 420, and a second differential signal for the compensating signal RF2 is applied to a base connection of the second transistor $T_8$ of the second transconductance stage 420. Consequently, the currents via the first transistor $T_5$ of the first transconductance stage 410 and the first transistor $T_7$ of the second transconductance stage 420 can be summed at the input of the mixer stage 430. Accordingly, the currents via the second transistor $T_6$ of the first transconductance stage 410 and the second transistor $T_8$ of the second transconductance stage 420 can be summed at the second input of the mixer stage 430. The mixer stage 430 comprises a first to fourth transistor $T_1, T_2, T_3, T_4$, a first and second load resistor $R_L$ and a DC voltage source (DC). The first transistor $T_1$ and the second transistor $T_2$ of the mixer stage 430 each have their emitter connections connected to the first input of the mixer stage 430, and the third transistor $T_3$ and the fourth transistor $T_4$ of the mixer stage 430 have their respective emitter connections connected to the second input of the mixer stage 430. The collector connections of the first transistor $T_1$ and the third transistor $T_3$ of the mixer stage 430 are connected to the voltage source DC via the first resistor RL, and the connections of the second transistor $T_2$ and the fourth transistor $T_4$ of the mixer stage 430 are connected to the DC voltage source DC via the second resistor $R_L$. A first differential signal for the local oscillator signal LO is applied to a base connection of the second transistor $T_2$ and of the third transistor $T_3$ of the mixer stage 430, and a second differential signal for the local oscillator signal LO is applied to a base connection of the first transistor $T_1$ and of the fourth transistor $T_4$ of the mixer stage 430. The mixer output signal IF can then be provided between the collector connection of the first transistor $T_1$ and the collector connection of the fourth transistor $T_4$ of the mixer stage 430. The mixer unit 400 thus has inputs for a differential received signal RF1, a differential compensating signal RF2 and a differential local oscillator signal LO and also an output for a differential mixer output signal IF.

In other words, FIG. 4 shows an example of an active reception mixer, as may be used in integrated circuits. The RF1 signal (received signal) can be converted from voltage to current in the input transistors $T_5$, $T_6$ (transconductance stage). The transistors $T_1, T_2, T_3, T_4$, which can be actuated by the local oscillator signal LO, can undertake the actual mixing function by virtue of their connecting the current signal from the input stage with alternate polarity to the two load resistors RL, where the current signal can be converted to voltage again.

The transistors $T_7$, $T_8$ allow the input stage comprising the transistors $T_5$, $T_6$ to be positioned a further time, for example, specifically parallel to the first stage. On the basis of the conversion of RF input voltage to a current signal, this can be enabled at this juncture. The reason is that two high-impedance current sources are connected in parallel, and the summed current finds its way to the mixer transistors $T_1, T_2, T_3, T_4$. It is thus possible to provide a mixer (reception mixer) having three inputs.

Figure 5:
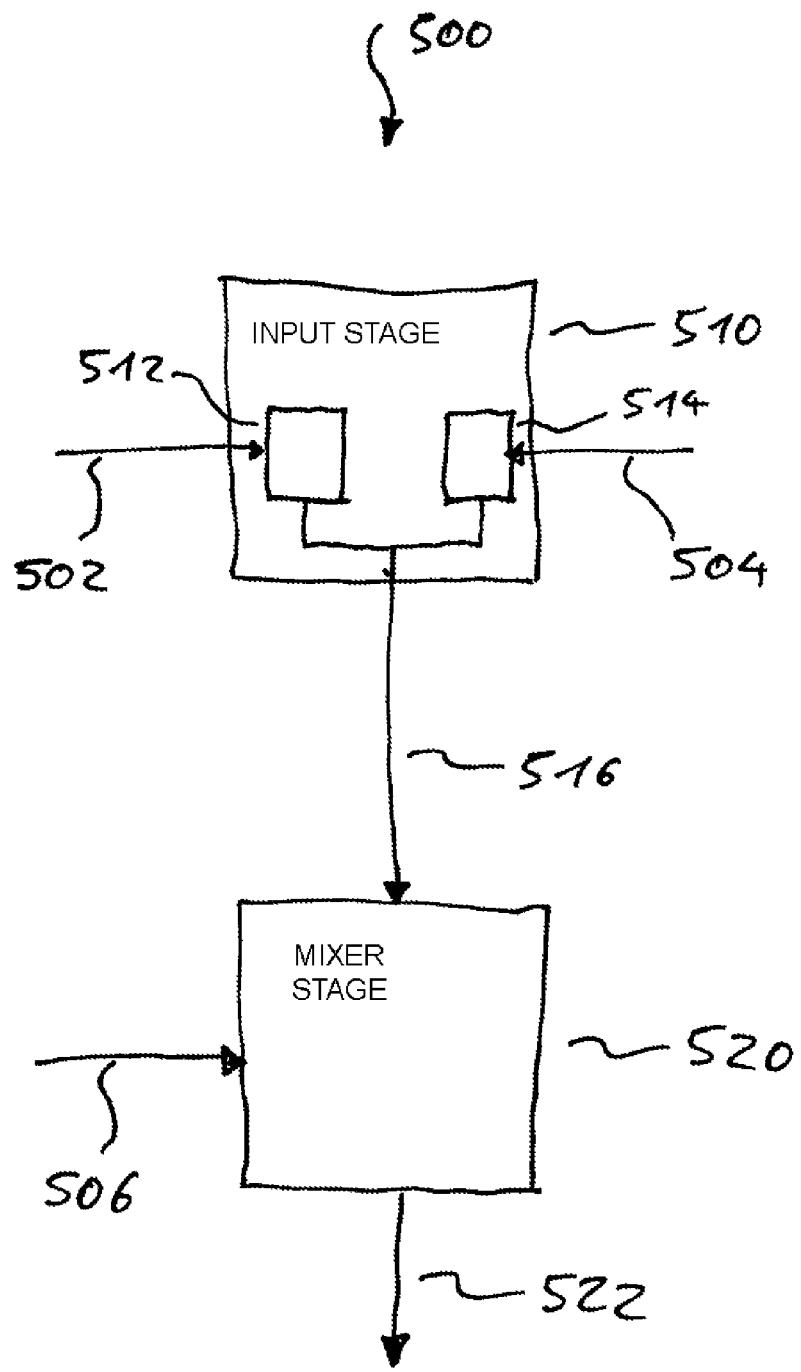
FIG. 5 shows a block diagram of a mixer unit.

FIG. 5 shows a block diagram of a mixer unit 500 as an exemplary embodiment. The mixer unit 500 comprises an input stage 510 and a mixer stage 520. The input stage 510 has a first transconductance stage 512 and a second transconductance stage 514. The first transconductance stage 512 can convert a received voltage signal 502 into a first current signal, and the second transconductance stage 514 can convert a compensating voltage signal 504 into a second current signal. Furthermore, the input stage 510 can sum the first current signal and the second current signal in order to obtain a summed current signal 516. The mixer stage 520 can mix the summed current signal 516 with a local oscillator signal 506 in order to obtain a mixer output signal 522.

In this way, a mixer unit having at least three inputs that is able to actively take account of a compensating voltage signal 504 by means of transconductance stages prior to the mixing of a received voltage signal 502 (up or down conversion), in order to reduce noise signal components in the mixer output signal 522, can be realized with little involvement and/or low power consumption.

Optionally, additionally or alternatively, the mixer unit 500 can implement one or more further aspects that correspond to one or more of the features that have been described above in connection with the general concept or one of the exemplary embodiments, particularly in relation to FIG. 4.

Some exemplary embodiments relate to the rejection of noise signals, an active loss suppressor or a homodyne receiver with supply of a compensating signal at a third mixer input. The concept described aims for reduction or even elimination of any power degradation in a reception mixer. In addition, the mixer design itself can be simplified, since it is possible to allow reduction of the dynamic range.

In the case of a proposed active loss suppressor (apparatus according to one of the exemplary embodiments), a compensating signal can be supplied to a mixer. This compensating signal may be an additional radio frequency signal (RF signal) that is added to the useful signal. The phase and amplitude of the compensating signal can be chosen such that self-interfering single components can be rejected in an optimal or distinct manner, for example. It is possible to achieve destructive interference of the self-interfering signal with the compensating signal.

One aspect is the supply of an additional radio frequency signal having a variable amplitude and phase directly to the mixer core via an additional radio frequency input (RF input).

Optionally, the actual radio frequency input signal (received signal) can (for example in FIG. 2) be supplied to the reception mixer via an amplifier in order to optimize or improve a total noise index. In addition, a radio frequency (RF) modulator output signal (compensating signal) can be coupled into the mixer via a second radio frequency (RF) input of the reception mixer. The radio frequency (RF) modulator may be a unit that can set the amplitude and phase of its output signal to an arbitrary ratio with respect to its input. By way of example, the radio frequency modulator may be connected to produce a common or ordinary local oscillator input or can derive the output signal from another radio frequency signal source in the system (e.g. from the transmission path, if existent).

The detailed realization of the proposed additional mixer input is dependent on the actual architecture of the circuit. By way of example, this can be realized by means of switches in the current domain, and it is thus possible for the additional input to be realized as an additional current input that can be added to the signal current.

One specific realization option is a mixer or a mixer unit having three inputs and a control loop for rejecting noise signals. In order to depict a further controlled variable for rejecting noise signals at the radio frequency (RF) input of the mixer, it is thus possible to introduce a mixer having an additional, third input. This may make it possible to add two radio frequency (RF) signals before they are converted to the intermediate frequency (or low frequency), which can be used to eliminate or reduce undesirable signals in the actual radio frequency portion of the circuit, for example.

This compensating signal can reduce or totally eliminate the aforementioned impairment of the mixer function when such noise signals are existent.

By way of example, FIG. 2 shows an apparatus that can be used to implement a homodyne receiver. Besides the mixer with an additional radio frequency (RF) signal input RF2, it is also possible for a control unit to be used that controls the production of the compensating signal. The compensating signal can be derived from an additional radio frequency (RF) signal source and can have its absolute value and phase set such that the sum of interference on RF1 (the received signal) and the compensating signal on RF2 cancel one another out (approximately) precisely.

The input signal used for controlling the compensating signal can be the undesirable output signal from the mixer that is intended to be reduced or minimized by the control system.

In one realization, the compensating signal can be produced from the local oscillator signal LO of the mixer or the apparatus, and merely the absolute value and phase are tuned using a suitable actuating element, such as an IQ modulator.

Some exemplary embodiments relate to a homodyne receiver having an apparatus according to the concept described or one of the exemplary embodiments.

In some exemplary embodiments, a radar system having a transmission unit and an apparatus according to the concept described or one of the exemplary embodiments is implemented (e.g. radar system for a vehicle). In this case, the transmission unit can send a transmission signal at the local oscillator frequency (e.g. in frequency-modulated form or with a frequency ramp) and the reception device can receive a reflection of the transmission signal from an object as the received signal.

Figure 6:
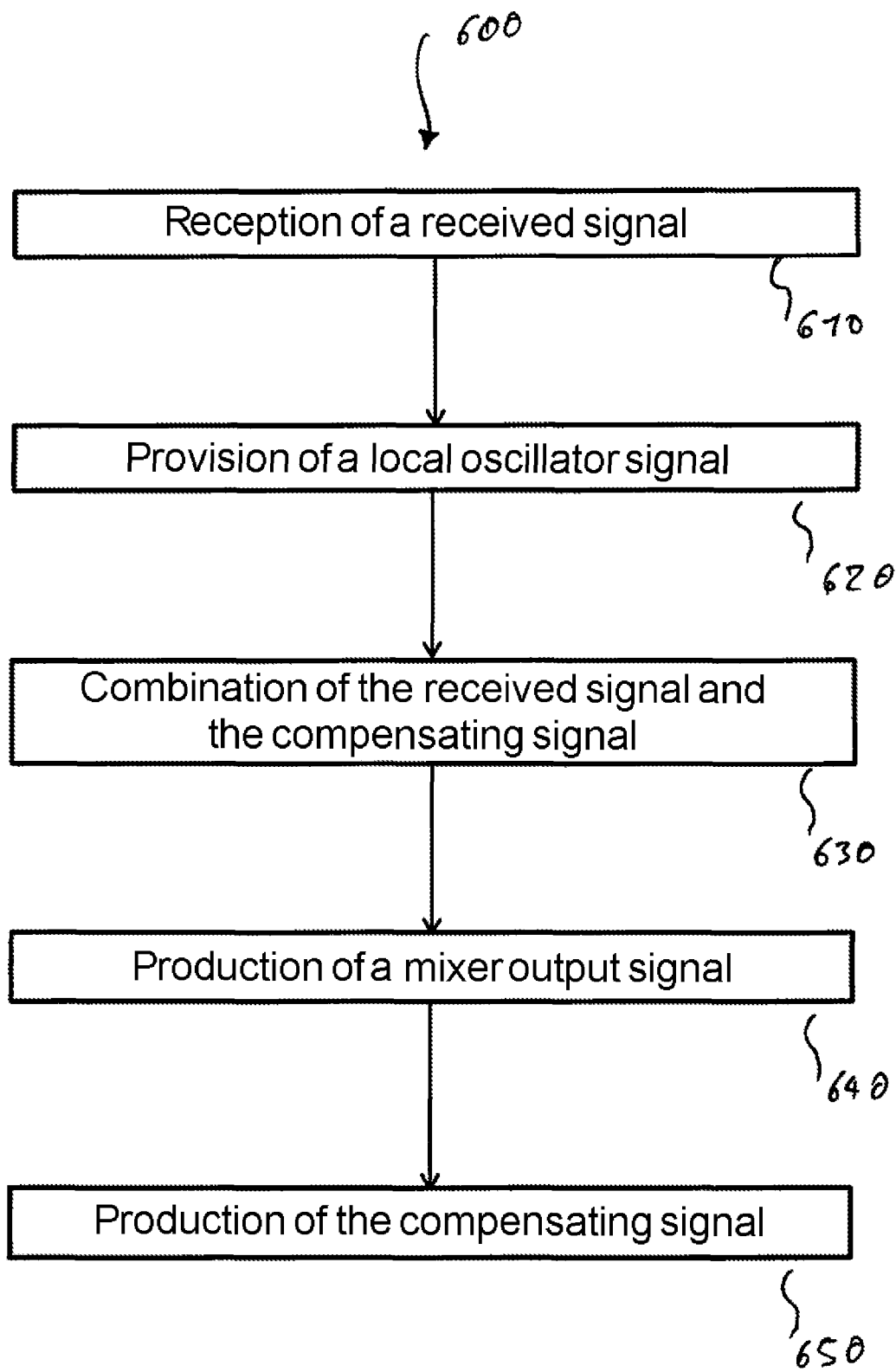
FIG. 6 shows a flowchart for a method for handling a received signal.

FIG. 6 shows a flowchart for a method 600 for handling a received signal as an exemplary embodiment. The method 600 comprises reception 610 of a received signal and provision 620 of a local oscillator signal. The received signal has at least one signal component at a first frequency. Furthermore, the method 600 comprises combination 630 of the received signal and a compensating signal using at least one active element in order to obtain a combined input signal. In addition, a mixer output signal is produced 640 on the basis of the compensated received signal and the local oscillator signal. In this case, the mixer output signal has a signal component, corresponding to the at least one signal component of the received signal, at a second frequency. The first frequency is higher than the second frequency. Furthermore, the method 600 comprises production 650 of the compensating signal on the basis of an analysis of the mixer output signal, as a result of which it is possible for noise components that the mixer output signal contains to be reduced on the basis of the compensating signal.

The method 600 may have one or more further steps that correspond to one or more of the aspects described above in connection with the concept or one of the exemplary embodiments.

The features disclosed in the description above, the claims below and the appended figures may be significant, and may be implemented, either individually or in arbitrary combination, for the implementation of an exemplary embodiment in their various embodiments.

Although some aspects have been described in connection with an apparatus, it goes without saying that these aspects are also a description of the corresponding method, which means that a block or an element of an apparatus is also intended to be understood to mean a corresponding method step or to mean a feature of a method step. Similarly, aspects that have been described in connection with or as a method step are also a description of a corresponding block or detail or feature of a corresponding apparatus.

Depending on the particular implementation requirements, it is possible for exemplary embodiments of the invention to be implemented in hardware or in software. The implementation can be performed using a digital storage medium, for example a floppy disk, a DVD, a Blu-Ray disk, a CD, a ROM, a PROM, an EPROM, an EEPROM or a FLASH memory, a hard disk or another magnetic or optical memory that stores electronically readable control signals that are able to interact, or do interact, with a programmable hardware component such that the respective method is carried out.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a single-chip system (SOC=system on chip), a programmable logic element or a field-programmable gate array (FPGA) with a microprocessor.

The digital storage medium may therefore be machine-readable or computer-readable. Some exemplary embodiments thus comprise a data storage medium that has electronically readable control signals that are capable of interacting with a programmable computer system or a programmable hardware component such that one of the methods described herein is carried out. An exemplary embodiment is therefore a data storage medium (or a digital storage medium or a computer readable medium) on which the program for carrying out one of the methods described herein is recorded.

In general, exemplary embodiments of the present invention may be implemented as a program, firmware, computer program or computer program product with a program code or as data, the program code or the data being effective for carrying out one of the methods when the program is executed on a processor or a programmable hardware component. By way of example, the program code or the data may also be stored on a machine-readable storage medium or data storage medium. The program code or the data may be present as source code, machine code or bytecode and also as other intermediate code, inter alia.

Furthermore, a further exemplary embodiment is a datastream, a signal train or a sequence of signals that is or are the program for carrying out one of the methods described herein. By way of example, the data stream, the signal train or the sequence of signals may be configured to be transferred via a data communication link, for example via the internet or another network. Exemplary embodiments are thus also signal trains that represent data and that are suitable for transmission via a network or a data communication link, the data being the program.

A program according to an exemplary embodiment can implement one of the methods when it is carried out, for example by reading memory locations or writing a data item or multiple data thereto, which brings about switching processes or other processes in transistor structures, in amplifier structures, or in other electrical, optical or magnetic assemblies or assemblies operating on the basis of a different operating principle, if need be. Accordingly, by reading a memory location, it is possible to capture, determine or measure data, values, sensor values or other information from a program. A program can therefore capture, determine or measure magnitudes, values, measured variables and other information by reading one or more memory locations, and can cause, prompt or perform an action and also actuate other appliances, machines and components by writing to one or more memory locations.

The exemplary embodiments described above are merely an illustration of the principles of the present invention. It goes without saying that modifications and variations of the arrangements and details described herein will be apparent to other persons skilled in the art. It is therefore intended that the invention be limited only by the scope of protection of the patent claims below and not by the specific details that have been presented using the description and the explanation of the exemplary embodiments herein.

The invention claimed is:

1. An apparatus for handling a received signal, comprising:
 a reception device configured to receive a received signal, wherein the received signal has at least one signal component at a first frequency;
 a mixer unit configured to combine the received signal and a compensating signal using at least one active element in order to obtain a compensated received signal, and to produce a mixer output signal on the basis of the compensated received signal and a local oscillator signal, wherein the mixer output signal has a signal component, corresponding to the at least one signal component of the received signal, at a second frequency, the first frequency being higher than the second frequency;
 a compensating unit configured to produce the compensating signal on the basis of an analysis of the mixer output signal, as a result of which noise components in the mixer output signal can be reduced based on the compensating signal,
 wherein the mixer unit comprises a mixer to mix the compensated received signal with the local oscillator signal to produce the mixer output signal; and
 a phase shifter configured to provide the local oscillator signal in temporally successive periods for the mixer unit with different phase shifts, as a result of which the mixer output signal has temporally successive portions with different phase shifts, wherein the compensating unit is configured to produce the compensating signal based on at least two portions of the mixer output signal with different phase shifts.

2. The apparatus as claimed in claim 1, wherein the compensating unit is configured to produce a control signal for the phase shifter, as a result of which a chronology of different phase shifts can be controlled by the control signal.

3. The apparatus as claimed in claim 1, wherein the phase shift is alternately +90° and −90°.

4. The apparatus as claimed in claim 1, wherein the phase shift is effected at a frequency that is lower than one thousandth of a local oscillator frequency of the local oscillator signal.

5. The apparatus as claimed in claim 1, wherein the mixer unit comprises a second mixer configured to produce a second mixer output signal on the basis of the received signal, a local oscillator signal that is phase-shifted with respect to the local oscillator signal used by the first mixer and the compensating signal, wherein the second mixer output signal has a signal component corresponding to the at least one signal component of the received signal, at the second frequency, wherein the compensating unit is configured to produce the compensating signal based on the first and second mixer output signals.

6. An apparatus for handling a received signal, comprising:
 a reception device configured to receive a received signal, wherein the received signal has at least one signal component at a first frequency;
 a mixer unit configured to combine the received signal and a compensating signal using at least one active element in order to obtain a compensated received signal, and to produce a mixer output signal on the basis of the compensated received signal and a local oscillator signal,
 wherein the mixer output signal has a signal component, corresponding to the at least one signal component of the received signal, at a second frequency, the first frequency being higher than the second frequency;
 a compensating unit configured to produce the compensating signal on the basis of an analysis of the mixer output signal, as a result of which noise components in the mixer output signal can be reduced based on the compensating signal,
 wherein the mixer unit comprises a mixer to mix the compensated received signal with the local oscillator signal to produce the mixer output signal, and
 wherein the compensating unit is configured to calculate an absolute value for a complex number during the analysis of the mixer output signal, wherein the complex number has a real portion based on a first phase shift for the local oscillator signal, and an imaginary portion based on a second phase shift for the local oscillator signal, wherein the compensating unit is configured to produce the compensating signal, as a result of which the absolute value of the complex number can be reduced.

7. The apparatus as claimed in claim 6, wherein the real portion is based on a DC voltage component of the mixer output signal in the case of the first phase shift for the local oscillator signal and the imaginary portion is based on a DC voltage component of the mixer output signal in the case of the second phase shift for the local oscillator signal.

8. An apparatus for handling a received signal, comprising:
a reception device configured to receive a received signal, wherein the received signal has at least one signal component at a first frequency;
a mixer unit configured to combine the received signal and a compensating signal using at least one active element in order to obtain a compensated received signal, and to produce a mixer output signal on the basis of the compensated received signal and a local oscillator signal,
wherein the mixer output signal has a signal component, corresponding to the at least one signal component of the received signal, at a second frequency, the first frequency being higher than the second frequency; and
a compensating unit configured to produce the compensating signal on the basis of an analysis of the mixer output signal, as a result of which noise components in the mixer output signal can be reduced based on the compensating signal,
wherein the received signal and the compensating signal are voltage signals,
wherein the mixer unit comprises a mixer, a first transconductance stage and a second transconductance stage,
wherein the first transconductance stage is configured to convert the received signal into a first current signal,
wherein the second transconductance stage is configured to convert the compensating signal into a second current signal,
wherein the mixer unit is configured to sum the first current signal and the second current signal to obtain a summed current signal, and
wherein the mixer is configured to mix the summed current signal with the local oscillator signal to obtain the mixer output signal.

9. The apparatus as claimed in claim 8, wherein the at least one active element is a transistor.

10. The apparatus as claimed in claim 8, wherein the compensating unit is configured to provide the compensating signal iteratively based on repeated analysis of the mixer output signal.

11. The apparatus as claimed in claim 8, wherein the compensating unit is configured to produce the compensating signal based on a local oscillator signal that is modified based on the analysis of the mixer output signal.

12. The apparatus as claimed in claim 11, wherein the compensating unit has an in-phase/quadrature phase modulator configured to modify the local oscillator signal based on the analysis of the mixer output signal to obtain the compensating signal.

13. The apparatus claimed in claim 8, wherein each of the two transconductance stages has a current source configured to be switched by a transistor to produce the relevant current signal when the received signal or the compensating signal is applied to a control connection of the transistor.

14. The apparatus as claimed in claim 8, wherein the mixer unit is a differential mixer unit.

15. A homodyne receiver comprising the apparatus claimed in claim 8.

16. A radar system comprising a transmission unit and an apparatus as claimed in claim 8, wherein the transmission unit is configured to send a transmission signal at a local oscillator frequency of the local oscillator signal, and wherein the reception device is configured to receive a reflection of the transmission signal from an object as the received signal.

17. A mixer unit comprising:
an input stage comprising a first transconductance stage and a second transconductance stage, wherein the first transconductance stage is configured to convert a received voltage signal into a first current signal, wherein the second transconductance stage is configured to convert a compensating voltage signal into a second current signal, and wherein the input stage is configured to sum the first current signal and the second current signal to obtain a summed current signal; and
a mixer stage configured to mix the summed current signal with a local oscillator signal to obtain a mixer output signal.

* * * * *